Jan. 22, 1957 C. C. MANCHESTER 2,778,377
FLOAT CONTROLLED VALVE
Filed Dec. 30, 1954
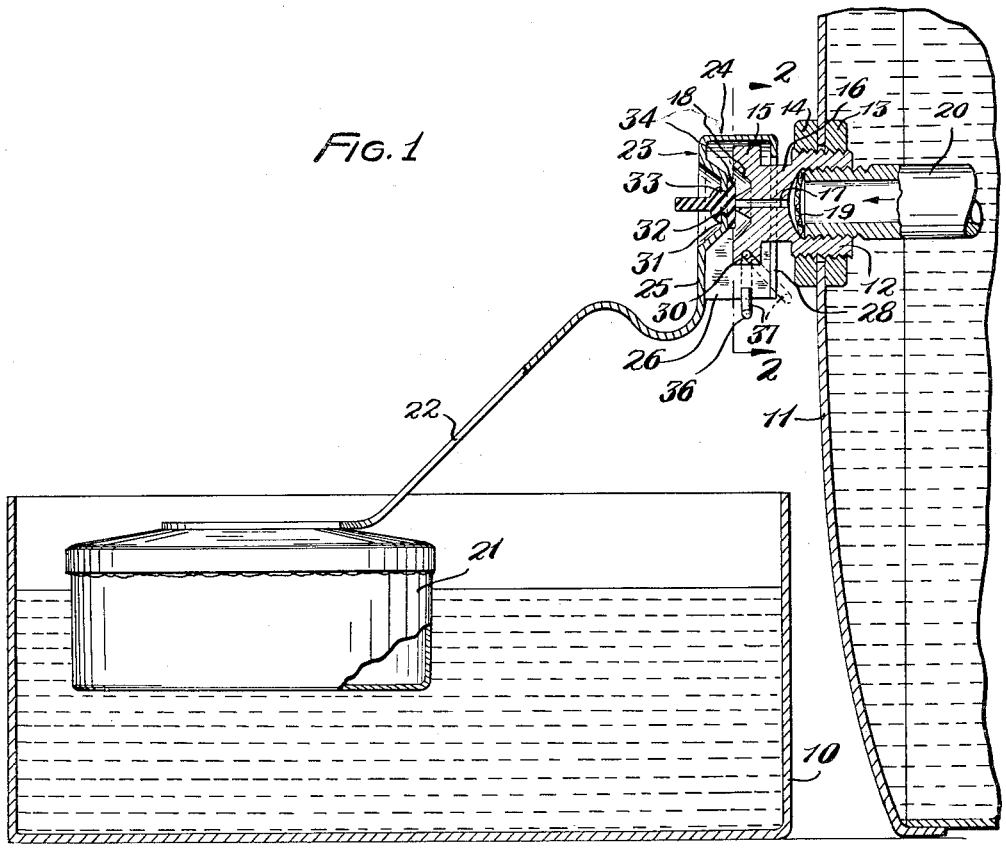
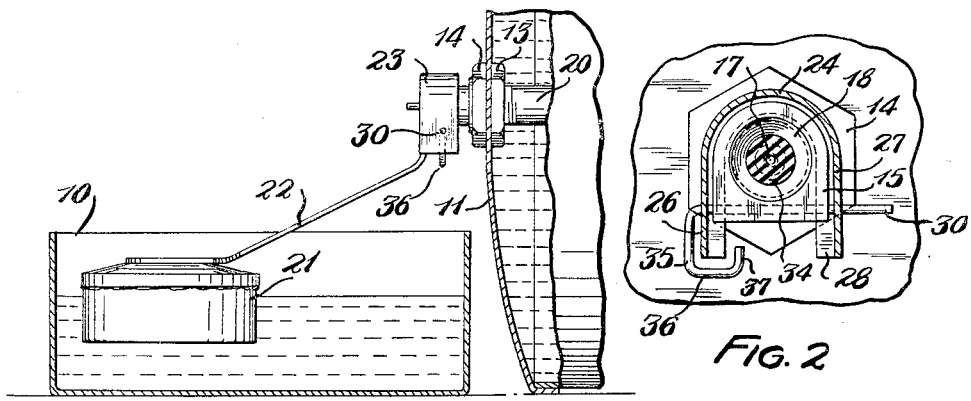
Fig. 1
Fig. 2
Fig. 3
INVENTOR.
CLYDE C. MANCHESTER
BY Hudson, Broughton,
Williams, David & Hoffmann
ATTORNEYS

United States Patent Office 2,778,377
Patented Jan. 22, 1957

2,778,377

FLOAT CONTROLLED VALVE

Clyde C. Manchester, Stryker, Ohio

Application December 30, 1954, Serial No. 478,772

2 Claims. (Cl. 137—448)

This invention relates to improvements in float controlled valves, and in particular valves for controlling the water level in a poultry fountain. However, the device has utility for other purposes, as will be appreciated by those skilled in the art. A fountain for the purpose stated should be of simple construction having the fewest possible number of parts compatible with certainty of operation. It should be capable of ready assembly and disassembly for cleaning and repair, and should be such as to avoid its being rendered inoperative accidentally.

One of the objects of the invention therefore is the provision of a float controlled valve suitable particularly for use in a poultry fountain.

Another object is the provision of such a valve having a minimum number of parts.

A further object is the mounting of the float upon a sheet metal member which comprises a lever and hood, the latter enclosing and protecting the valve and carrying a soft rubber valve piece mounted above the lever pivot to close a port also located above the lever pivot.

Another object of the invention is the provision of means for adjusting the effective length of the float lever without any addition of parts.

Still another object is the provision of a removable pintle for the lever which is held by gravity in operative position but which may be withdrawn readily by turning it through a given angle and then pulling it lengthwise.

Other objects and features of novelty will appear as I proceed with the description of that embodiment of the invention which, for the purposes of the present application, I have illustrated in the accompanying drawing, in which Fig. 1 is an elevational view partly in vertical section, of a poultry watering device embodying the invention;

Fig. 2 is a sectional view, taken substantially on the line 2—2 of Fig. 1; and

Fig. 3 is a view similar to Fig. 1 but on a smaller scale and illustrating a different adjustment of the lever.

In the drawing a poultry watering pan or other container is illustrated at 10. It is desirable to maintain a substantially constant level of water in the pan and to replenish any water taken from the pan. Accordingly, automatic means is provided for feeding water to the pan, as from water in a relatively large supply contained in a barrel or the like shown fragmentally at 11. Feed from the barrel to the pan is by gravity, although a pressure feed could be employed.

In the embodiment shown in the drawing a hole is formed in a side wall of the barrel 11 to receive a threaded portion 12 of a valve body. The valve body may be fixed in place by means of inner and outer nuts 13 and 14 which are threaded into position to tightly engage the inner and outer surfaces of the barrel, thus rigidly supporting the valve body and sealing the joint against leakage. The outer end of the valve body is provided with a head 15, and between the head and the threaded portion 12 there is a restricted or neck portion 16.

A passage 17 is bored axially through the valve body, its outer end constituting the port of the valve. Preferably the outer surface of the head 15 has an annular groove 18 formed therein spaced slightly from the outer end of the passage 17 so that the surface surrounding the port and forming the valve seat is of relatively small area. Across the rear end of the passage 17 a fine wire screen filter 19 is disposed to keep foreign material out of the valve. This screen may be held in place by a tube 20 threadably mounted in the valve body as shown in Fig. 1. The tube 20 instead of taking water from a barrel 11 could be a connection to a suitable water system and supported by any suitable means at the proper elevation above the level of water in the pan 10.

A float 21 buoyed up by the water in pan 10, has a lever 22 soldered or otherwise attached thereto. This lever is formed of sheet metal such as brass. It may be approximately one-half inch in width throughout the major portion of its extent and is flexible but non-resilient, so that when bent as illustrated in Fig. 1 it will retain that form.

The sheet metal from which the upper end of the lever is formed is much wider than the intermediate portion thereof. It is bent and shaped to form a hood 23 which has a curved top 24, a front wall 25 and two side walls 26 and 27. It is also provided with a flange 28 which extends behind the head 15 of the valve body but clears the constricted portion 16 thereof. A pintle 30 extends through aligned holes in the side walls 26 and 27 and through a bore in the head 15. By this means the hood 23 and therefore the lever 21 are pivotally mounted upon the valve body below the level of the passage 17 therein.

The front 25 of the hood is preferably formed with a rearwardly offset portion 31 having a hole 32 therethrough for the reception of a constricted portion of a soft rubber button 33 comprising an inner disk shaped valve piece 34 disposed directly opposite the port end of passage 17. This rubber button is inserted through the rear side of the hood before the hood and lever are assembled on the valve body. It can be forced into position because of its yielding nature and when in position quite firmly grips the offset portion 31 of the hood. It is however readily replaceable when necessary.

The pintle 30 is so formed as to prevent accidental removal. For this purpose it has a downwardly extending arm 35 from which projects a short length 36 parallel to the active part of the pintle and a short upwardly directed end 37 parallel to the arm 35. Gravity tends to maintain these parts in the position illustrated in Fig. 2 and in full lines in Fig. 1, and in this angular position the end 37 by striking against the wall 26 prevents the pintle from being pulled out of operative position. However, when the operator wishes to disassemble the device he swings the part 35, 36, 37 around to the dotted line position of Fig. 1 where it clears the wall 26. The pintle may then be withdrawn and the hood and lever removed.

The pintle 30 is formed of wire of a gauge to fit loosely the passage 17. When it is withdrawn and the operator lifts the lever and hood off the valve body with one hand he can push the pintle into passage 17 with his other hand and thus clean out the passage. The quick and easy removal of the movable part of the device from the fixed part without the use of tools and the quick and easy cleaning out of the passage constitute important features of the invention.

The shape of the hood 23 and its mounting with respect to the valve body prevents spattering of water as it flows out of the port at the front end of passage 17, and causes the water to drop directly downward into the pan 10. It will also be noted that the position of the pintle 30 below the valve is advantageous because the valve opens by gravity when the float 21 descends and closes by the upward thrust upon the float when the water level rises. No valve closing spring is needed.

In order to suit the device to different installations, means must be provided to adjust the effective length of the lever 22, since the vertical distance between the valve body and the desired level of water in the pan may vary considerably. This I accomplish without the use of any additional parts whatever simply by making the lever partially or wholly of a flat strip of flexible but non-resilient metal which may be bent transversely to its length. In the illustrated case the position of the lever in Fig. 3 provides an effectively long lever while its position in Fig. 1 shortens the effective length of the lever to whatever extent may be necessary.

Having thus described my invention, I claim:

1. In a device of the class described, a liquid container and means supplying liquid thereto and maintaining a substantially constant level therein, comprising a fixed valve body having a liquid passage therethrough terminating in a port above said liquid level, a float in the container, a lever attached to said float, a pintle in said body below said port upon which said lever is mounted, said lever carrying a soft rubber valve piece for contacting and closing said port when said float is in its raised position, said lever having an integral hood enclosing the top, front and sides of said valve body and directing downwardly the flow of liquid from said port, said pintle having a rebent end outside the hood which normally extends downwardly by gravity along one side wall of the hood and then inwardly and upwardly within the hood to hold the pintle against accidental withdrawal but which may be swung laterally to clear the side wall of the hood and permit withdrawal of the pintle.

2. A device substantially as defined in claim 1, wherein the diameter of said pintle is slightly less than the bore of said liquid passage, whereby when the pintle is withdrawn the lever and hood may be lifted off the valve body and the pintle may be used to clean out the liquid passage.

References Cited in the file of this patent

UNITED STATES PATENTS

| | | |
|---|---|---|
| 788,426 | Pinkerton | Apr. 25, 1905 |
| 922,142 | Hogg | May 18, 1909 |

FOREIGN PATENTS

| | | |
|---|---|---|
| 121,770 | Great Britain | Jan. 9, 1919 |